3,266,924
METHOD FOR PRODUCING FREE-FLOWING ADDITIVES MIXTURE FOR POLYETHYLENE
Don C. Haeske, Tuscola, Ill., Floyd L. Cassidy, Gibsonia, Pa., and John L. Thompson, Pasadena, Tex., assignors to National Distillers and Chemical Corporation, New York, N.Y., a corporation of Virginia
No Drawing. Filed July 26, 1962, Ser. No. 212,722
10 Claims. (Cl. 106—308)

This invention relates to a process for producing a mixture of additives for polyethylene and copolymers of polyethylene which imparts good slip and antiblocking properties to film made therefrom, such a mixture having considerably better handling properties than any of its components taken alone. More particularly, this invention concerns the method of producing mixtures containing finely divided siliceous material and the amide or amides of one or more higher fatty acids.

Among the major drawbacks of thin films of certain plastic compositions, such as polyethylene, e.g., about 0.1 to 5 mils thick, are the tendency for these films to block and their high film-to-film coefficient of friction. Blocking is the adherence of two or more film surfaces to each other while standing under pressure, while the inability to slide one film layer over another usually is the result of poor slip, i.e., a high coefficient of friction of the film. There is a relationship between slipping and antiblocking properties of film, although good slip does not necessarily correlate with the resistance of a film to block. The difficulties of film blocking and slipping are alleviated by the incorporation of small amounts of additives into the polyethylene base resin before it is extruded into film. The most commonly used additives are the amides of higher saturated and unsaturated fatty acids, such as those containing between 16 and 22, inclusive, carbon atoms. The most desirable slip agents from this group are oleamide and erucamide. An example of an adequate antiblock agent from this group is stearamide. Other fatty acid amides and derivatives thereof have also been used as slip and antiblock agents. Such slip additive compounds include, for example, palmitamide and N,N'-ethylene(bis)oleamide, and other fatty acid amide-derived compounds used as antiblock agents include ethylene distearamide, N-methanol stearamide, and N-ethanol stearamide.

Recent studies as disclosed in U.S. Patent 2,956,035, have shown that a small amount of finely divided siliceous material also imparts antiblock properties to polyethylene film when blended into the polyethylene prior to extrusion of same. Furthermore, it has also recently been discovered that the presence of finely divided silica-containing material having an average particle size of from about 0.01 to 0.5 micron enhances the ink receptivity of polyethylene film containing the conventional higher fatty acid amide additives, as disclosed in U.S. patent application Serial Number 210,828, filed July 18, 1962 for Richard J. Kremer and entitled, "Process To Enhance Ink Adhesion Properties of Polyethylene Film," now abandoned.

The major difficulty encountered in previously used methods of compounding any of the above mentioned fatty acid amides with polyethylene is attributed to the undesirable, inherent handling characteristics of such amides. The problem is quite pronounced at environmental temperatures, such as from about 80° to 120° F., which are frequently experienced in commercial polyethylene processing plants. In this temperature range the amides, which at ambient temperatures are normally in the form of a waxy, somewhat slippery, solid flake or powder, become tacky, cohesive, and adhesive. These objectionable characteristics create difficulties and complications in accurate metering and weight control, especially when these amides are fed by means of conventional automatic or semi-automatic solids feeding machines which are designed to handle free-flowing, relatively uniform solids. The problem is especially prevalent in the automatic weigh feeders and feed hoppers accessory to polyethylene extruder machines. The amides cake up in the feeders, adhere to the walls of same, and do not flow properly, all of which cause the final polyethylene article to have inconsistent levels of slip and antiblock agent content.

The difficulties incident to the handling and feeding of finely divided, small particle silica in conventional solids metering equipment are severe dusting and accompanying personnel health hazards and the tendency of the material to act more like a liquid than divided solids.

The major purpose of this invention is to devise a method for producing additives mixtures that bestow good slip and antiblocking properties to polyethylene film, such mixtures having the form of a free-flowing, non-dusting, uniform, easily handled powder. These mixtures are ultimately blended with polyethylene before its extrusion into film.

For the purposes of this invention it is to be understood that the term "polyethylene" is intended to include polyethylene and copolymers thereof, more particularly copolymers of ethylene with alpha olefins such as propylene, butene-1, isobutylene, hexene-1, isooctene-1, and triisobutylene.

Briefly stated, this object is accomplished by the process comprising the steps of intimately blending predetermined amounts of finely divided siliceous material with measured amounts of a fatty acid amide slip agent, or with said slip agent and a fatty acid amide antiblock agent, at a temperature close to the melting point of the amide or amides, to produce a substantially homogeneous mixture, cooling the mixture to a point well below the solidification temperature of the amide or amides, and recovering such mixture in the form of free-flowing granules, powder, or flakes. The term "siliceous material" used herein includes commercial silicas, silica gels, diatomaceous earths and the like. In the practice of this invention, finely divided silica is the preferred material.

It has been discovered that the admixing of finely divided silica having an average particle size between about 0.01 to 10 microns with fatty acid amides having the above described slip and antiblock characteristics completely changes the physical properties of the amides with regard to handling properties without any evidence of the dusting characteristics of the silica attaching to the mixture. The free-flowing, dustless additives mixture may be transported with relative ease for admixing with polyethylene to prepare uniform blends of the plastic material and additive materials to impart the desired properties to film made therefrom. Such methods include, for example, blending of the ingredients in conventional melt apparatus, such as a Banbury mixer, heated rolls, etc.

The preparation of the compositions in accordance with the process of this invention may be carried out in any mixing zone apparatus equipped with suitable agitation and external heating means. It is desirable to be able to close said mixing zone off from contact with the atmosphere after charging the components, such as with a clamp-type lid or porthole. The mixing chamber heating means may consist of a jacket or metallic tube tracing for the heating medium (steam, hot oil, or the like). A clamped-cover, jacketed, sigma-blade type mixer with its intense mixing and kneading action has been found to give good results in producing uniform, completely blended products.

In the practice of this invention a particular sequence of addition of the components to the mixer is highly advantageous. The siliceous material, preferably silica, is introduced first and heated with agitation to a temperature of about 160° to 240° F., preferably about 180° to 220° F. The fatty acid amide or amides are then added, and agitation and heating in the aforementioned temperature ranges are continued until a homogeneous blend is achieved. If the amides are charged first, the mixing will not be so efficient, resulting in possible overheating and darkening of these compounds and causing the appearance of black specks in the final product. In the alternate less desirable procedures, the siliceous material in dispersed form and the amides are charged simultaneously to the mixing zone, or the amides are introduced, and then the siliceous material, providing mixing is adequate and care is taken not to darken the amides because of localized hot spots and overheating in said mixing zone. The heating period should be kept at the minimum necessary to produce a homogeneous blend; excessive heating times have no advantage and may cause the formation of color-containing compounds in the amides. Optimum mixing and heating cycle times range from about 15 to 20 minutes.

After the heating cycle, the resulting mixture is cooled, while being agitated, to a point well below the solidification temperature of the amides, preferably about 120° to 130° F. No advantage is gained by the time consuming operation of cooling the blend to a lower temperature since, as aforementioned, the practice of this invention permits feeding of the components at the relatively high temperatures which are often encountered in processing plants. As the mixture goes through the transition from the melted to the solid state, a granular form is achieved. Longer or more intense agitation will produce a powder form. In the alternative, the melted mixture may be fed to a water-cooled, rotating drum flaker from which a flaked product is recovered.

Although it is generally more convenient to compound the additives mixture by batch operation, the blending and recovery of the product may be performed continuously, if so desired.

As previously described, the average particle size of the finely divided silica component may be from between about 0.01 to 10 microns. The preferred particle size range is 0.015 to 0.20 micron, since the smaller particles blend more smoothly with polyethylene, thereby providing fewer nuclei for surface imperfections and irregularities in the finished film.

Generally, when the additives mixture is compounded from the silica and a fatty acid amide slip agent, such as oleamide or erucamide, the mixture contains from about 23% to 60% amide and from about 40% to 77% silica, by weight. When the additives mixture is compounded from the silica and a fatty acid amide slip agent together with a fatty acid amide antiblock agent, such as stearamide, the mixture contains from about 36% to 75% silica, 16% to 34% slip agent, and 8% to 37% fatty acid amide antiblock agent by weight. In some cases it has been found to be advantageous to have the silica concentration below about 70% to obtain a product with superior handling properties. The following table shows the varying concentrations of components in additives mixtures, which have been prepared by the method of this invention whereby the silica is introduced first into the mixing zone and which have been successfully utilized in pilot plant and commercial operations. The data illustrate the versatility inherent in the practice of this invention with regard to composition of the blends.

Table.—*Representative additive mixtures*

GROUP 1

| Component | Concentration in Weight Percent | | | |
|---|---|---|---|---|
| Oleamide | 42.8 | 42.8 | 42.8 | 60 |
| Silica | ² 57.2 | ¹ 57.2 | ³ 57.2 | ¹ 40 |

GROUP 2

| Component | Concentration in Weight Percent | | | | | | | | |
|---|---|---|---|---|---|---|---|---|---|
| Erucamide | 23.1 | 25.0 | 29.4 | 33.3 | 37.3 | 40.0 | 42.8 | 45.5 | 50.0 |
| Silica ¹ | 76.9 | 75.0 | 70.6 | 66.6 | 62.7 | 60.0 | 57.2 | 54.5 | 50.0 |

GROUP 3

| Component | Concentration in Weight Percent | | | | | | | |
|---|---|---|---|---|---|---|---|---|
| Oleamide | 27.3 | 16.6 | 19.6 | 22.2 | 24.8 | 27.8 | 30.3 | 33.3 |
| Stearamide | 36.3 | 8.4 | 9.8 | 11.2 | 12.5 | 13.9 | 15.2 | 16.7 |
| Silica | ² 36.4 | ¹ 75.0 | ¹ 70.6 | ¹ 66.6 | ¹ 62.7 | ¹ 58.3 | ¹ 54.5 | ¹ 50.0 |

GROUP 4

| Component | Concentration in Weight Percent | | | | | | | |
|---|---|---|---|---|---|---|---|---|
| Erucamide | 16.6 | 19.6 | 21.5 | 24.8 | 26.7 | 28.6 | 30.3 | 33.3 |
| Stearamide | 8.4 | 9.8 | 10.7 | 12.5 | 13.3 | 14.2 | 15.2 | 16.7 |
| Silica ¹ | 75.0 | 70.6 | 67.8 | 62.7 | 60.0 | 57.2 | 54.5 | 50.0 |

¹ Particle size range: 0.08–0.13 micron.
² Particle size range: 0.015–0.02 micron.
³ Average particle size: 0.022 micron.

Generally the amounts of fatty acid amide slip agent and fatty acid antiblock agent blended with polyethylene for film extrusion will be, based on the weight of the base polyethylene resin, in the range of about 0.01% to 0.5% of the former when used alone, and about 0.01% to 0.5% of each when both slip and antiblock properties are desired. Thus it is possible, by calculated diversification of the component concentrations in the additives mixtures made in accordance with this invention, to achieve any desired slip and antiblock agent level in the finished polyethylene film.

While there are above disclosed but a representative number of embodiments of the process of the invention herein presented, it is possible to produce still other embodiments without departing from its inventive concept, and it is desired therefore that only such limitations be imposed on the appended claims as are stated therein.

What is claimed is:

1. A method for producing a homogeneous mixture of additives comprising the steps of charging to a mixing zone from about 40% to 77% of finely divided siliceous material, based on the weight of the additives mixture, said siliceous material having an average particle size of from between about 0.01 to 10 microns; heating the siliceous material to a temperature of from about 160° to 240° F.; charging to said mixing zone with agitation from about 23% to 60%, based on the weight of the additives mixture, of a fatty acid amide slip agent; cooling said mixture to a point below the solidification temperature of the amide while continuing agitation; and recovering the resulting powder-like mixture from said zone.

2. The method according to claim 1 wherein the fatty acid amide slip agent is oleamide.

3. The method according to claim 1 wherein the fatty acid amide slip agent is erucamide.

4. The method of claim 1 wherein the finely divided siliceous material is finely divided silica.

5. The method of claim 4 wherein the finely divided silica has a particle size range of 0.015 to 0.20 micron.

6. A method for producing a homogeneous mixture of additives for polyethylene which imparts good slip and antiblocking properties to film made therefrom, such additives mixture having free-flowing, dust-free, good handling, powder-like characteristics, comprising the steps of charging to a mixing zone from about 36% to 75% of finely divided siliceous material, based on the weight of the additives mixture, said siliceous material having an average particle size of from between about 0.01 to 10 microns; heating the siliceous material to a temperature of from about 160 to 240° F.; charging to said mixing zone with agitation from about 16% to 34%, based on the weight of the additives mixture, of a fatty acid amide slip agent and from about 8% to 37% of a fatty acid amide antiblock agent; blending said siliceous material and amides at a temperature from about 160 to 240° F. to produce a homogeneous mixture; cooling said mixture to a point below the solidification temperature of the amides while continuing agitation; and recovering the resulting powder-like mixture from said apparatus.

7. The method according to claim 6 wherein the fatty acid amide slip agent is oleamide and the amide antiblock agent is stearamide.

8. The method according to claim 6 wherein the fatty acid amide slip agent is erucamide and the amide antiblock agent is stearamide.

9. The method of claim 6 wherein the finely divided siliceous material is finely divided silica.

10. The method of claim 9 wherein the finely divided silica has a particle size range of 0.015 to 0.20 micron.

References Cited by the Examiner
UNITED STATES PATENTS

| | | | |
|---|---|---|---|
| 2,956,035 | 10/1960 | Mock | 260—41 |
| 2,971,922 | 2/1961 | Clem | 106—308 |

TOBIAS E. LEVOW, *Primary Examiner*.

J. E. POER, *Assistant Examiner*.